(12) United States Patent
Sano et al.

(10) Patent No.: US 9,393,749 B2
(45) Date of Patent: Jul. 19, 2016

(54) METHOD OF MANUFACTURING PNEUMATIC TIRE

(75) Inventors: Takuzou Sano, Kanagawa (JP); Noboru Takada, Kanagawa (JP)

(73) Assignee: THE YOKOHAMA RUBBER CO., LTD., Tokyo (JP)

( * ) Notice: Subject to any disclaimer, the term of this patent is extended or adjusted under 35 U.S.C. 154(b) by 902 days.

(21) Appl. No.: 13/266,889

(22) PCT Filed: Jun. 17, 2009

(86) PCT No.: PCT/JP2009/061054
§ 371 (c)(1),
(2), (4) Date: Oct. 28, 2011

(87) PCT Pub. No.: WO2010/128566
PCT Pub. Date: Nov. 11, 2010

(65) Prior Publication Data
US 2012/0049398 A1    Mar. 1, 2012

(30) Foreign Application Priority Data

May 7, 2009   (JP) .................. 2009-112893

(51) Int. Cl.
*B29D 30/10*       (2006.01)
*B29D 30/06*       (2006.01)
(Continued)

(52) U.S. Cl.
CPC ............ *B29D 30/0601* (2013.01); *B29C 33/02* (2013.01); *B29D 30/0654* (2013.01);
(Continued)

(58) Field of Classification Search
CPC .... B29D 30/12; B29D 30/18; B29D 30/0661;
B29D 2030/0038; B29D 30/1614; B29D 2030/241; B29D 30/246; B29D 30/2607; B29D 30/3014; B29D 30/36; B29D 30/10
USPC .............. 156/126, 132, 401, 402, 406.2, 414; 425/31, 32, 54
See application file for complete search history.

(56) References Cited

U.S. PATENT DOCUMENTS 1,577,664 A * 3/1926 Tew ........................... 156/406.6
4,134,783 A * 1/1979 Appleby et al. ............... 156/396
(Continued)

FOREIGN PATENT DOCUMENTS

GB           922396    *  8/1959    ......... B29D 30/3014
JP      2001-088143 A       4/2001
(Continued)

OTHER PUBLICATIONS

Machine generated English language translation of RU 2235641 (original document dated Jul. 2003).*
(Continued)

*Primary Examiner* — Martin Rogers
(74) *Attorney, Agent, or Firm* — Global IP Counselors, LLP

(57) ABSTRACT

A cylindrical body is formed by mounting a carcass to the outer periphery of a film formed of a thermoplastic resin or a thermoplastic resin elastomer composition. A molded body is formed by fitting bead rings on opposite width direction ends of the cylindrical body, and the molded body is sucked on a transfer mold's inner periphery. After a rigid inner mold is inserted into the molded body, suction stops and the molded body is transferred to the inner mold's outer periphery. Opposite carcass ends in a width direction are turned up on the inner mold, while other tire members are stacked on the molded body's outer periphery to mold a green tire. The tire and inner mold are placed in disposed inside a heated curing mold and the film is inflated to cure the tire and bond the film to the inner peripheral tire surface to form an inner layer.

4 Claims, 11 Drawing Sheets

(51) Int. Cl.
  B29C 33/02      (2006.01)
  B29D 30/08      (2006.01)
  B29D 30/24      (2006.01)
  B29D 30/26      (2006.01)
  B60C 1/00       (2006.01)
  B60C 5/14       (2006.01)

(52) U.S. Cl.
  CPC ............ *B29D30/0681* (2013.01); *B29D 30/08* (2013.01); *B29D 30/10* (2013.01); *B29D 30/246* (2013.01); *B29D 30/2607* (2013.01); *B60C 1/0008* (2013.04); *B60C 5/14* (2013.01); *B29D 30/0661* (2013.01); *B29D 2030/0647* (2013.01); *B29D 2030/0655* (2013.01); *B29D 2030/0682* (2013.01); *B60C 2005/145* (2013.04)

(56) References Cited

U.S. PATENT DOCUMENTS

| | | | | |
|---|---|---|---|---|
| 4,684,422 | A * | 8/1987 | Roedseth | 156/126 |
| 5,152,951 | A * | 10/1992 | Ahmad et al. | 264/502 |
| 5,560,801 | A * | 10/1996 | Siegenthaler | 156/415 |
| 5,738,158 | A * | 4/1998 | Ozawa et al. | 152/510 |
| 6,334,919 | B1 * | 1/2002 | Takeyama et al. | 156/123 |
| 6,758,930 | B1 * | 7/2004 | Felten | 156/111 |
| 7,931,768 | B2 * | 4/2011 | Seevers et al. | 156/117 |
| 8,158,050 | B2 * | 4/2012 | Sano et al. | 264/501 |
| 2003/0157209 | A1* | 8/2003 | Scarzello et al. | 425/35 |

FOREIGN PATENT DOCUMENTS

| | | | | |
|---|---|---|---|---|
| JP | 2003-340824 A | | 12/2003 | |
| RU | 2235641 | * | 7/2003 | ............ B29D 30/06 |
| WO | WO-2004/048075 A1 | | 6/2004 | |
| WO | 2006/058599 | * | 6/2006 | ............ B29D 30/26 |
| WO | WO-2009/081656 A1 | | 7/2009 | |

OTHER PUBLICATIONS

International Search Report of corresponding International Application No. PCT/JP2009/061054, dated on Aug. 25, 2009.

* cited by examiner

METHOD OF MANUFACTURING PNEUMATIC TIRE

CROSS-REFERENCE TO RELATED APPLICATIONS

This U.S. National stage application claims priority under 35 U.S.C. §119(a) to Japanese Patent Application No. 2009-112893, filed in Japan on May 7, 2009, the entire contents of Japanese Patent Application No. 2009-112893 are hereby incorporated herein by reference.

FIELD OF THE INVENTION

The present invention relates to a method of manufacturing a pneumatic tire, and more particularly to a method of manufacturing a pneumatic tire, which enables a pneumatic tire having excellent uniformity to be manufactured efficiently, the pneumatic tire having an inner layer which is light in weight and excels in air penetration preventing performance.

BACKGROUND INFORMATION

Various methods of manufacturing a pneumatic tire, in which a green tire is molded on the outer peripheral surface of a metal rigid inner mold, and the molded green tire is placed inside a curing mold along with the rigid inner mold for curing, have been proposed as described, for example, in Japanese patent application Kokai publication No. 2001-88143 and Japanese patent application Kokai publication No. 2003-340824. The manufacturing method using such a rigid inner mold does not require a conventionally used bladder made of rubber, and can eliminate the process of, for example, detaching the molded green tire from a making drum. Moreover, compared with the case where a bladder is used for manufacturing, there is an advantage in that the inner peripheral surface of the cured tire can be formed into a predetermined shape with high precision.

However, because the green tire is pressed by the curing mold from only the outside during the curing, the pressing force acting on the inner peripheral surface of the green tire is small. Accordingly, for example, even when non-uniformity in the volume of the tire constituting members exists on the inner peripheral surface of the tire, it is difficult to correct the non-uniformity, and thus improvement in uniformity of the cured tire is limited.

In addition, when the inner peripheral surface of the green tire is pressed by the outer peripheral surface of the rigid inner mold, spaces between divided bodies forming the rigid inner mold leave marks on the inner peripheral surface of the cured tire, and thus there is a problem of reduced appearance quality.

Moreover, although butyl rubber is mainly used for an inner layer (innermost peripheral surface) of the green tire, an additional work of, for example, applying release agent is needed in order to easily release the inner layer from the outer peripheral surface of the rigid inner mold.

Furthermore, using an inner layer formed of butyl rubber is disadvantageous in reducing the tire weight because an inner layer formed of butyl rubber needs a certain thickness to secure sufficient air penetration preventing performance. For this reason, an inner layer which is light in weight and excels in air penetration preventing performance has been demanded.

An object of the present invention is to provide a method of manufacturing a pneumatic tire, which enables a pneumatic tire having excellent uniformity to be manufactured efficiently, the pneumatic tire having an inner layer which is light in weight and excels in air penetration preventing performance.

A method of manufacturing a pneumatic tire according to the present invention to achieve the above-described object is characterized in that a primary molded body is formed by fitting bead rings on opposite ends, in a width direction, of a cylindrically-shaped body in which at least a carcass material is mounted on an outer peripheral side of a film formed of a thermoplastic resin or a thermoplastic elastomer composition obtained by blending a thermoplastic resin with an elastomer; the primary molded body is set to be sucked and held to an inner peripheral surface of a transfer and holding mold; a cylindrically-shaped rigid inner mold including multiple divided bodies is inserted inside the primary molded body; thereafter suction by the transfer and holding mold is stopped, and the primary molded body is transferred to an outer peripheral surface of the rigid inner mold; next, opposite ends of the carcass material in a width direction thereof are turned up on the rigid inner mold, while other tire constituting members are stacked on an outer peripheral surface of the primary molded body so that a green tire is molded; the green tire is disposed, together with the rigid inner mold, inside a curing mold installed in a curing apparatus; and the rigid inner mold and the curing mold are heated to a predetermined temperature and the film is pressurized from an inner peripheral side to be inflated, so that the green tire is cured and the film is brought into close contact with and bonded to an inner peripheral surface of the tire; next the cured tire is taken out of the curing apparatus; and the rigid inner mold is detached from the cured tire.

Here, when the primary molded body is sucked and held to the inner peripheral surface of the transfer and holding mold, it is also possible that the transfer and holding mold is disposed at an outer peripheral side of the primary molded body, and the primary molded body is pressurized from an inner peripheral side of the primary molded body, while the primary molded body is sucked by the transfer and holding mold from an outer peripheral side of the primary molded body. When the green tire is cured, the film is pressurized to be inflated from an inner peripheral side with a pressure of 0.01 MPa to 3.0 MPa. Moreover, for example, air is sucked from an inside of the curing mold to an outside, while the green tire disposed inside the curing mold is cured.

According to a method of manufacturing a pneumatic tire of the present invention, a primary molded body is formed by fitting bead rings on opposite ends, in the width direction, of a cylindrically-shaped body in which at least a carcass material is mounted on the outer peripheral side of a film formed of a thermoplastic resin or a thermoplastic elastomer composition; the primary molded body is set to be sucked and held to the inner peripheral surface of a transfer and holding mold; a cylindrically-shaped rigid inner mold including multiple divided bodies is inserted inside the primary molded body; thereafter, suction by the transfer and holding mold is stopped; whereby the primary molded body can be smoothly transferred to the outer peripheral surface of the rigid inner mold without damaging the film on the inner peripheral surface.

Next, the opposite ends of the above-mentioned carcass material in the width direction thereof are turned up on the rigid inner mold, while other tire constituting members are stacked on the outer peripheral surface of the primary molded body so that the green tire is molded; the green tire is disposed, together with the rigid inner mold, inside the curing mold installed in the curing apparatus; the rigid inner mold and the curing mold are heated to a predetermined temperature and the film is pressurized from an inner peripheral side to be inflated, so that the green tire is cured. Accordingly, unvulcanized rubber of the tire constituting members is pressed against the inner peripheral surface of the curing mold and flows in the circumferential direction, whereby even when non-uniformity in the volume of the tire constituting members exists, the non-uniformity can be corrected. Hence, uniformity of the tires to be manufactured can be improved.

The film is made to serve as a conventional bladder as described above, and moreover, at the time of curing the green tire, the film is brought into close contact with and bonded to the inner peripheral surface of the tire to form an inner layer. This film is formed with a thermoplastic resin or a thermoplastic elastomer composition. For this reason, compared with the conventional inner layer which is formed of butyl rubber, the film is light in weight and has good gas barrier property, and thus manufactured tires are light in weight and have excellent air penetration preventing performance.

In addition, the green tire is disposed inside the curing mold together with the rigid inner mold, whereby a conventional work of detaching the green tire from the making drum is not required, and thus the green tire can be easily disposed at a predetermined position inside the curing mold. Further, the film which serves as the inner layer also functions as a release material between the inner peripheral surface of the tire and the outer peripheral surface of the rigid inner mold, whereby an additional work of, for example, applying release agent is not required. In this manner, the number of work processes can be reduced, and thus the productivity can be improved.

DETAILED DESCRIPTION OF EMBODIMENTS

Figure 1:
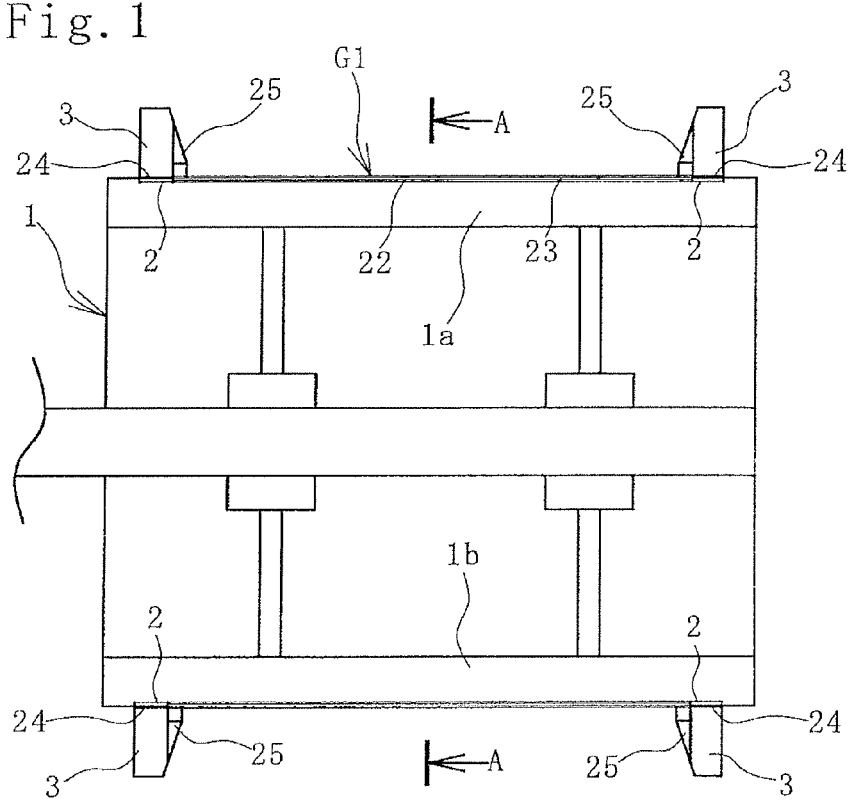
FIG. 1 is a vertical sectional view illustrating the process of molding a primary molded body.

Hereinafter, a method of manufacturing a pneumatic tire according to the present invention is described based on the embodiments shown in the drawings. The same reference numerals are used for the same members before and after curing.

Figure 18:
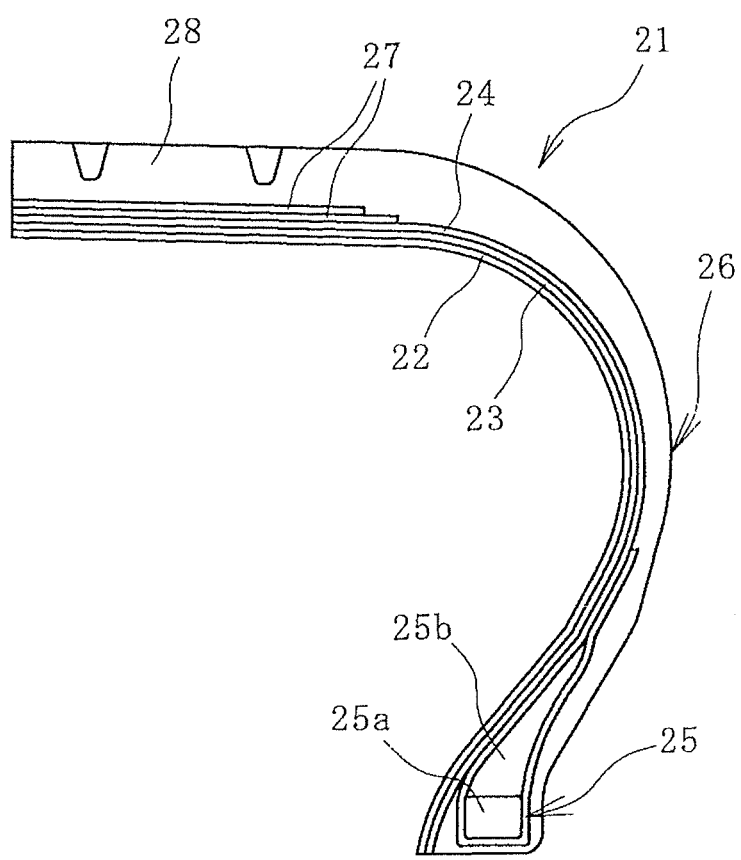
FIG. 18 is a meridian half cross sectional view illustrating a pneumatic tire manufactured by a disclosed embodiment.

FIG. 18 illustrates a pneumatic tire 21 manufactured by the present invention. In the pneumatic tire 21, a carcass material 24 is laid between a pair of bead rings 25, and the carcass material 24 is folded back around a bead core 25a from the inner side to the outer side. A tie rubber 23 and a film 22 are stacked on the inner peripheral side of the carcass material 24. The film 22 on the innermost side is an inner layer which prevents air penetration, and the film 22 and the carcass material 24 are bonded securely by the tie rubber 23 interposed therebetween. A rubber member forming a sidewall portion 26, and a rubber member forming a tread portion 28 are provided on the outer peripheral side of the carcass material 24.

A belt layer 27 is provided over the entire periphery in the tire circumferential direction on the outer peripheral side of the carcass material 24 of the tread portion 28. A reinforcing cord forming the belt layer 27 is disposed so as to be inclined to the tire circumferential direction, and stacked upper and lower belt layers 27 are disposed so that reinforcing cords thereof cross each other. A pneumatic tire 21 manufactured by the present invention is not limited to the structure shown in FIG. 18, and the present invention is applicable to the manufacture of a pneumatic tire with a different structure.

The pneumatic tire 21 has a major structural feature in that the inner layer is formed of the film 22 in place of a conventional butyl rubber. The thickness of the film 22 is, for example, 0.005 mm to 0.2 mm.

The film 22 used in the present invention includes a thermoplastic resin or a thermoplastic elastomer composition obtained by blending a thermoplastic resin with an elastomer.

Examples of the thermoplastic resin include: polyamide-based resins [for example, nylon 6 (N6), nylon 66 (N66), nylon 46 (N46), nylon 11 (N11), nylon 12 (N12), nylon 610 (N610), nylon 612 (N612), nylon 6/66 copolymers (N6/66), nylon 6/66/610 copolymers (N6/66/610), nylon MXD6, nylon 6T, nylon 6/6T copolymers, nylon 66/PP copolymers, and nylon 66/PPS copolymers]; polyester-based resins [for example, aromatic polyesters such as polybutylene terephthalate (PBT), polyethylene terephthalate (PET), polyethylene isophthalate (PEI), polybutylene terephthalate/tetramethylene glycol copolymer, PET/PEI copolymers, polyarylate (PAR), polybutylene naphthalate (PBN), liquid crystal polyester, and polyoxyalkylene diimide diacid/polybutylene terephthalate copolymers]; polynitrile-based resins [for example, polyacrylonitrile (PAN), polymethacrylonitrile, acrylonitrile/styrene copolymers (AS), methacrylonitrile/styrene copolymers, and methacrylonitrile/styrene/butadiene copolymer]; poly (meth) acrylate-based resin, [for example, poly methyl methacrylate (PMMA), polymethylmethacrylate, ethylene ethyl acrylate copolymer (EEA), ethylene acrylic acid copolymer (EAA), and ethylene methyl acrylate resin (EMA)]; polyvinyl-based resins [for example, vinyl acetate (EVA), polyvinyl alcohol (PVA), vinyl alcohol/ethylene copolymers (EVOH), polyvinylidene chloride (PVDC), polyvinyl chloride (PVC), vinyl chloride/vinylidene chloride copolymers, and vinylidene chloride/methyl acrylate copolymers]; cellulose-based resins [for example, cellulose acetate, and cellulose acetate butyrate]; fluororesins [for example, polyvinylidene fluoride (PVDF), polyvinyl fluoride (PVF), polychlorotrifluoroethylene (PCTFE), and tetrafluoroethylene/ethylene copolymers (ETFE)]; imide-based resins [for example, aromatic polyimide (PI)].

Examples of the elastomer include: diene rubbers and their hydrogenated products [for example, NR, IR, epoxidized natural rubbers, SBR, BR (high-cis BR and low-cis BR), NBR, hydrogenated NBR, and hydrogenated SBR]; olefin-based rubbers [for example, ethylene propylene rubbers (EPDM and EPM), and maleic acid-modified ethylene propylene rubber (M-EPM); butyl rubber (IIR); copolymers of isoprene and aromatic vinyl or diene monomer; acrylic rubber (ACM); ionomers; halogen-containing rubbers [for example, Br-IIR, Cl-IIR, brominated isobutylene para-methylstyrene copolymers (Br-IPMS), chloroprene rubber (CR), hydrin rubber (CHC and CHR), chlorosulfonated polyethylene (CSM), chlorinated polyethylene (CM), and maleic acid-modified chlorinated polyethylene (M-CM)]; silicone rubbers [for example, methyl vinyl silicone rubber, dimethyl silicone rubber, and methylphenylvinyl silicone rubber]; sulfur-containing rubbers [for example, polysulfide rubber]; fluororubbers [for example, vinylidene fluoride-based rubbers, fluorine-containing vinyl ether-based rubbers, tetrafluoroethylene propylene-based rubbers, fluorine-containing silicone-based rubbers, and fluorine-containing phosphazene-based rubbers]; thermoplastic elastomers [for example, styrene-based elastomers, olefin-based elastomers, polyester-based elastomers, urethane-based elastomers, and polyamide-based elastomers].

In the thermoplastic elastomer composition used in the present invention, the weight ratio between a thermoplastic resin component (A) and an elastomer component (B) is determined as appropriate by the balance of the thickness and the flexibility of the film. For example, the weight ratio of the thermoplastic resin component (A) to the total weight of the thermoplastic resin component (A) and the elastomer component (B) is preferably 10% to 90%, and more preferably 20% to 85%.

A compounding agent and other polymers such as a compatibilizer can be mixed to the thermoplastic elastomer composition used in the present invention as a third component in addition to the above-mentioned essential components (A) and (B). The purposes of mixing other polymers include: improvement of the compatibility between the thermoplastic resin component and the elastomer component, improvement of processability and formability of material into a film, improvement of heat resistance, and cost reduction. Examples of the materials used for these purposes include polyethylene, polypropylene, polystyrene, ABS, SBS, and polycarbonate.

The film 22 formed of the above-mentioned thermoplastic resin or the thermoplastic elastomer composition has excellent gas barrier property because it excels in the surface orientation of high-polymer chains. As shown above, in the pneumatic tire 21 manufactured by the present invention, the film 22 which has better gas barrier property than butyl rubber serves as the inner layer. Accordingly, compared with the conventional pneumatic tire, excellent air penetration preventing performance can be obtained.

Furthermore, the thickness of the inner layer formed of the conventional butyl rubber is, for example, 0.5 mm to 5.0 mm, but the thickness of the film 22 is 0.005 mm to 0.2 mm. Thus, the weight of the inner layer can be significantly reduced, and this reduction greatly contributes to reduction of the weight of the pneumatic tire 21.

The process of manufacturing the pneumatic tire 21 is described below.

Figure 2:
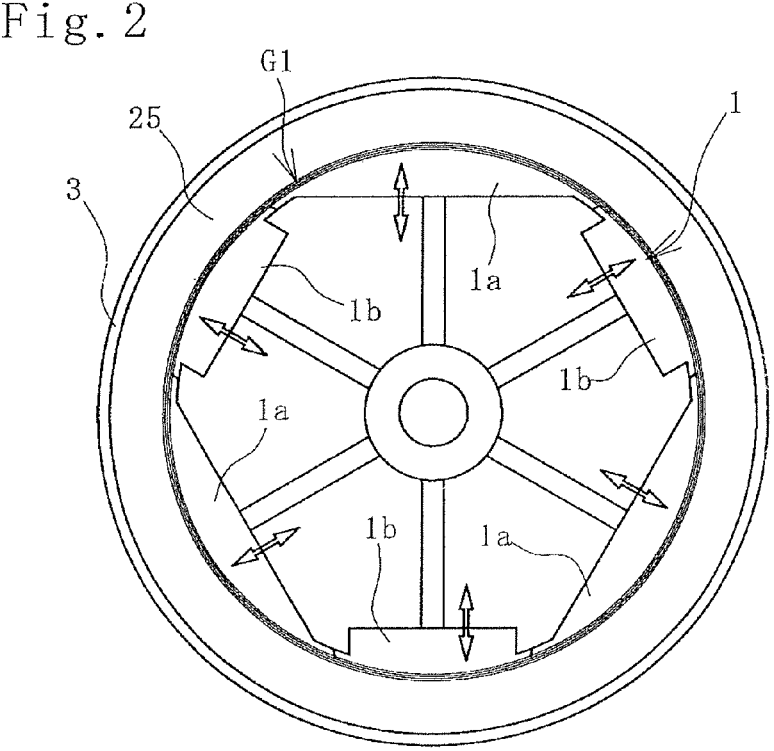
FIG. 2 is a cross-sectional view taken along A-A in FIG. 1.

First, a primary molded body G1 is molded using a primary making drum 1 illustrated in FIGS. 1 and 2. The primary making drum 1 is formed of multiple segments 1a, 1b which are divided in the circumferential direction, and two types of segments 1a, 1b are each movable in the radial direction. Accordingly, the primary making drum 1 is a cylindrical body which is expandable and contractible. The number of the segments 1a, 1b is 6 in this embodiment, but it is not limited to 6.

Fixing rings 2 are fitted on opposite ends, in the width direction, of the primary making drum 1, and each segment 1a is moved in a radially-outward direction to make the primary making drum 1 into a cylindrical shape. The film 22, the tie rubber 23, and the carcass material 24 are placed so as to be stacked in this order on the outer peripheral surface of the primary making drum 1 which is made into a cylindrical shape, whereby a cylindrically-shaped body is formed. The carcass material 24 projects out from the film 22 and the tie rubber 23 at both sides in the width direction.

In the case where the film 22 preformed in a tubular shape is used, the tubular film 22 is fitted on the primary making drum 1 to form a cylindrically-shaped body. In the case where strip-shaped film 22 is used, the strip-shaped film 22 is wrapped around the outer peripheral surface of the primary making drum 1 to form a cylindrically-shaped body. In the latter case, the strip-shaped film 22 and the tie rubber 23, or the strip-shaped film 22, the tie rubber 23, and the carcass material 24 are pre-stacked to form a stacked body, then the stacked body can be wrapped around the outer peripheral surface of the primary making drum 1 to form a cylindrically-shaped body.

Next, the bead rings 25 are disposed on the opposite ends of the carcass material 24 in the width direction thereof on the outer peripheral side. Then, the carcass fixing rings 3 are disposed on the opposite ends of the carcass material 24 in the width direction thereof on the outer peripheral side. Thus, the opposite ends of the carcass material 24 in the width direction thereof are fixed by being sandwiched between the fixing rings 2 and the carcass fixing rings 3. The bead rings 25 are fixed on the inner sides of the carcass fixing rings 3. In this manner, the primary molded body G1 is molded by fitting the bead rings 25 on the opposite ends, in the width direction, of a cylindrically-shaped body in which at least the carcass material 24 is mounted on the outer peripheral side of the film 22.

Figure 3:
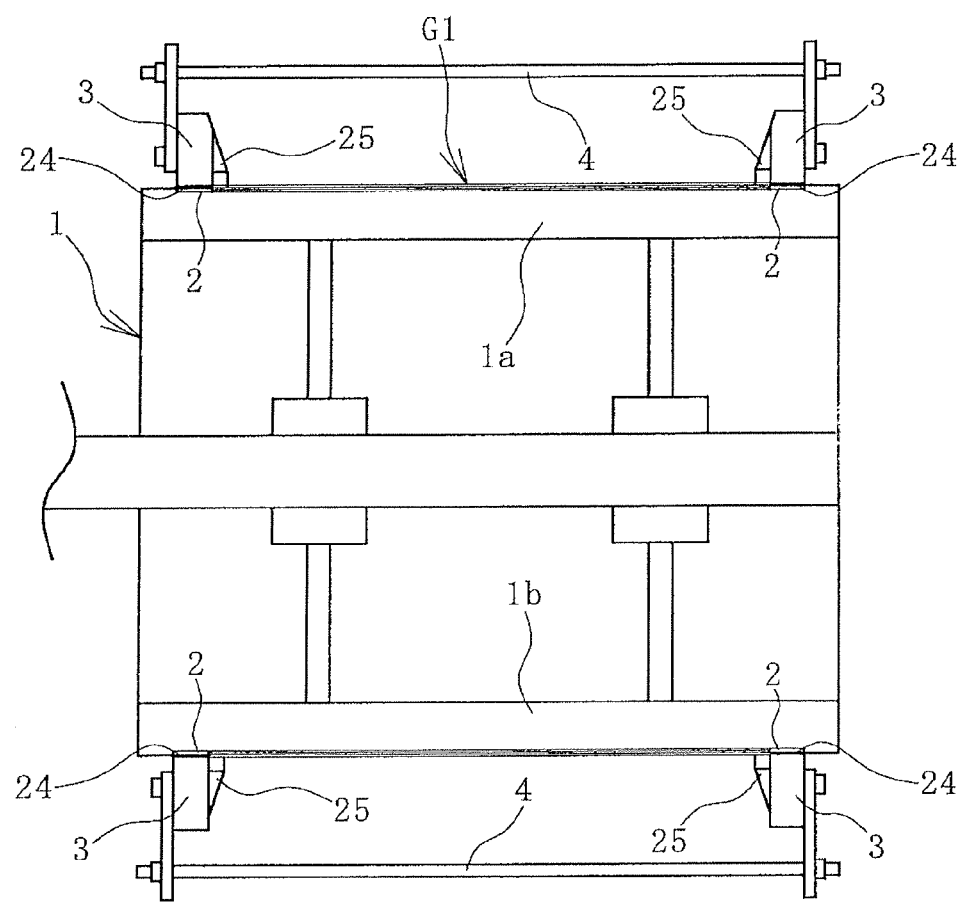
FIG. 3 is a vertical sectional view illustrating the state where a space adjusting plate is connected to carcass fixing rings in FIG. 1.

Next, both carcass fixing rings 3 are coupled with each other via a space adjusting plate 4 as illustrated in FIG. 3. The space adjusting plate 4 is attached to the carcass fixing rings 3 using a fixing member such as a bolt.

Next, the segments 1a, 1b are moved in a radially-inward direction, and the primary making drum 1 is removed from the cylindrically-shaped primary molded body G1. Accordingly, the primary molded body G1 is in a state to be held by the fixing rings 2, the carcass fixing rings 3, and the space adjusting plate 4.

Figure 4:
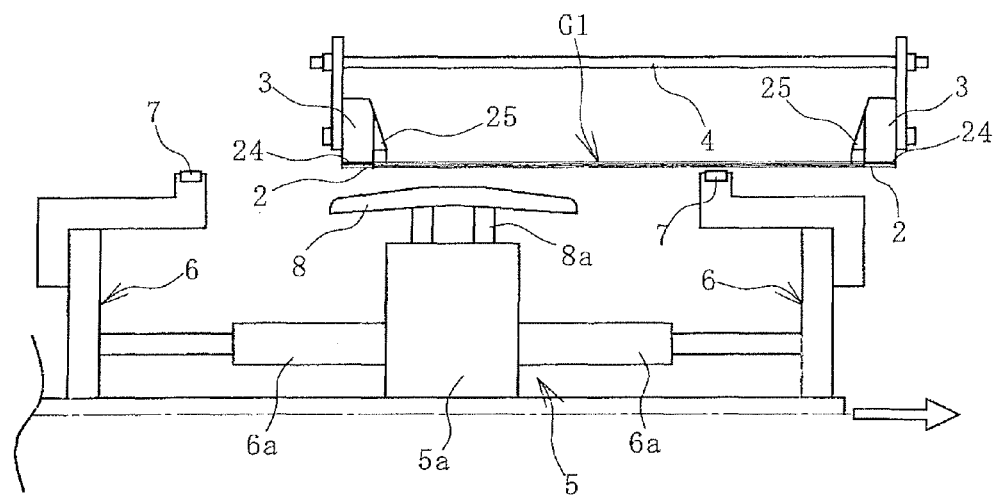
FIG. 4 is an upper half vertical sectional view illustrating the state of inserting an inflation mold into the primary molded body.
Figure 6:
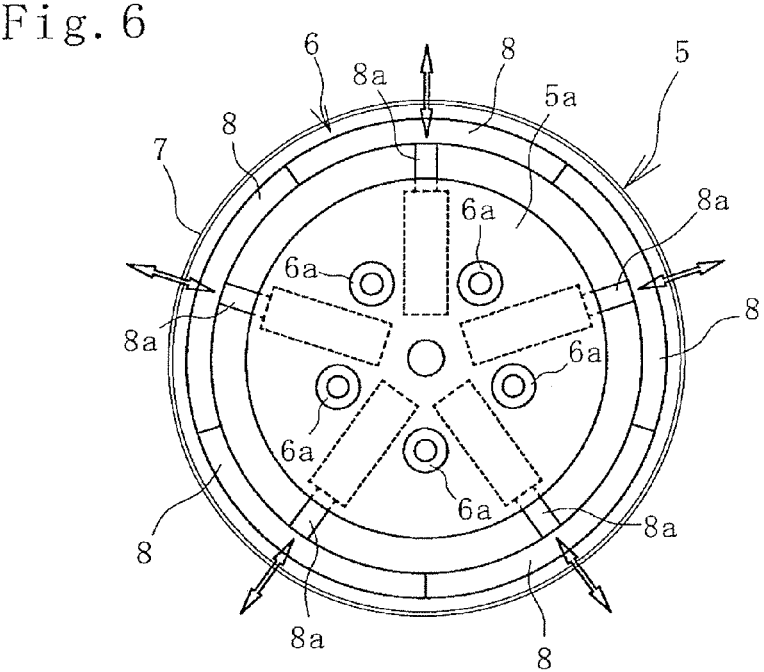
FIG. 6 is a vertical sectional view illustrating the internal structure of the inflation mold in FIG. 4.

Next, a cylindrically-shaped inflation mold 5 is inserted inside the primary molded body G1 as illustrated in FIG. 4. As illustrated in FIGS. 4 and 6, the inflation mold 5 has disc-shaped side plates 6 on both sides of a core portion 5a in the width direction thereof, while the core portion 5a is provided with multiple pressing plates 8 divided in the circumferential direction. Although the number of the pressing plates 8 is 5 in this embodiment, but it is not limited to 5.

The side plates 6 are moved in the width direction by cylinders 6a provided in the core portion 5a. Expandable and contractible sealing members 7 are provided in the outer peripheral edge portions of the side plates 6.

Each pressing plate 8 is configured to be moved in the radial direction by a cylinder 8a provided in the core portion 5a. The outer peripheral surface of the pressing plate 8 has approximately the same shape as the profile of the inner peripheral surface of the tire to be manufactured.

After the inflation mold 5 is inserted inside the primary molded body G1, the sealing members 7 are expanded so that the peripheral portions (the fixing rings 2 and the carcass fixing rings 3) of the bead rings 25 are securely fixed by the side plates 6. Subsequently, the space adjusting plate 4 is detached from the carcass fixing rings 3.

Figure 5:
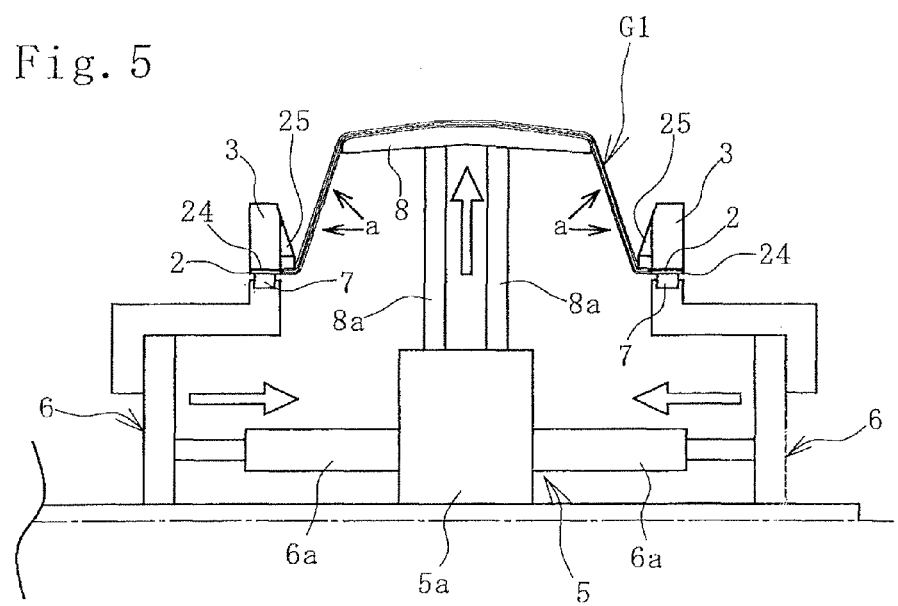
FIG. 5 is an upper half vertical sectional view illustrating the state of expanding and deforming the primary molded body toward the outer peripheral side.

Next, as illustrated in FIG. 5, each cylinder 6a is set free, and the rod of each cylinder 8a is extended to press the pressing plate 8 against the inner peripheral surface of the primary molded body G1, while slightly pressurizing the primary molded body G1 by injecting air a from the inner peripheral side so that the primary molded body G1 is expanded and deformed to the outer peripheral side. At this point, both bead rings 25 (the side plates 6) are moved so as to be closer to each other.

Figure 7:
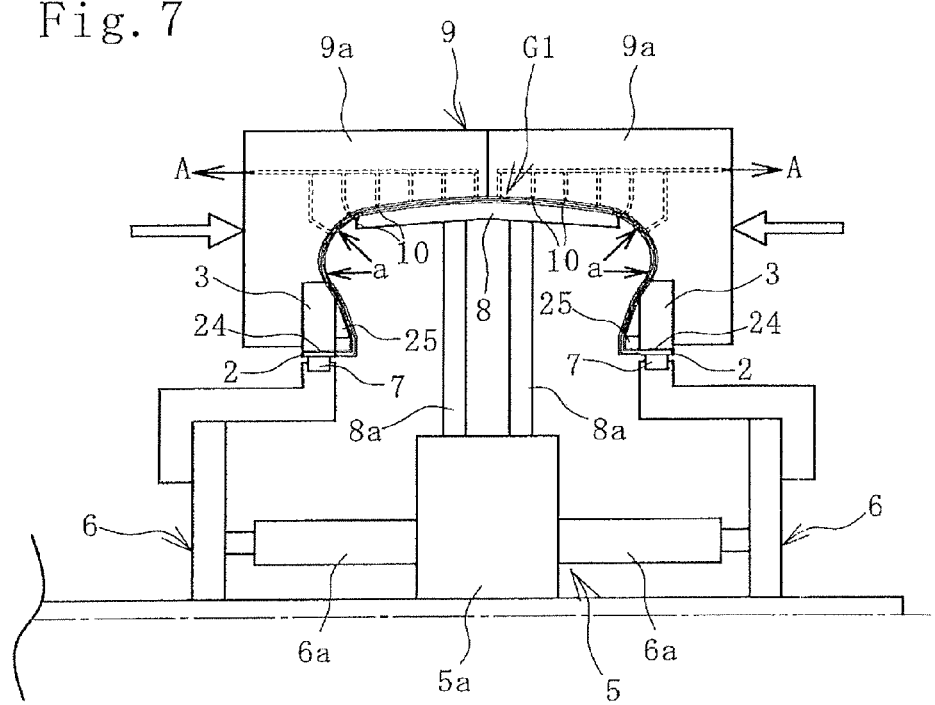
FIG. 7 is an upper half vertical sectional view illustrating the process of sucking and holding the primary molded body by a transfer and holding mold.

Next, as illustrated in FIG. 7, a transfer and holding mold 9 is disposed on the outer peripheral side of the primary molded body G1. Suction means such as a vacuum pump is detachably connected to the transfer and holding mold 9. The transfer and holding mold 9 is formed with divided molds 9a which are divided in half in the width direction. The inner peripheral surface of the transfer and holding mold 9 is formed in an annular shape, and a large number of suction holes 10 communicating with the suction means are formed.

Next, the air a is further injected from the inner peripheral side of the primary molded body G1 to pressurize the primary molded body G1, while air A is sucked through the suction holes 10 of the transfer and holding mold 9 with the divided molds 9a assembled, so that the primary molded body G1 is sucked from the outer peripheral side. Thereby, the primary molded body G1 is in a state to be sucked and held to the inner peripheral surface of the transfer and holding mold 9. Subsequently, the rods of cylinders 8a are contracted to retreat the pressing plate 8 and the sealing members 7 are contracted, whereby the inflation mold 5 is removed from the primary molded body G1. Suction of the primary molded body G1 by the transfer and holding mold is continued until the primary molded body G1 is transferred to a rigid inner mold 11.

Figure 8:
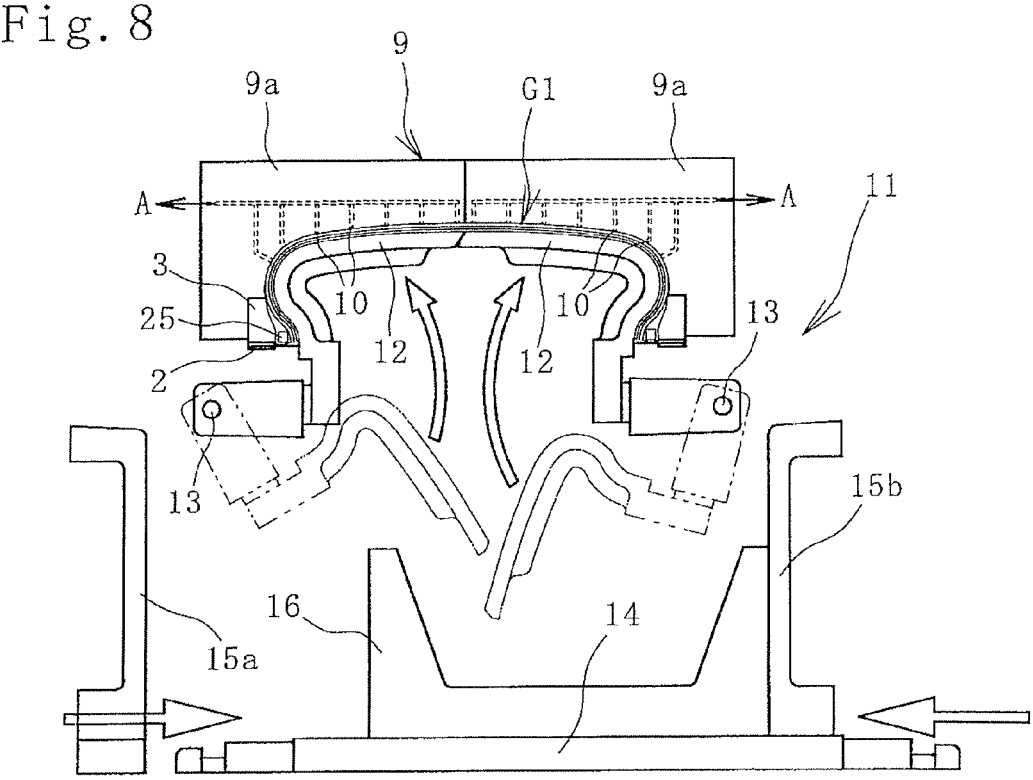
FIG. 8 is an upper half vertical sectional view illustrating the process of inserting a rigid inner mold into the primary molded body.

Next, as illustrated in FIG. 8, the cylindrically-shaped rigid inner mold 11 is inserted inside the primary molded body. Detailed structure of the rigid inner mold 11 is described later. Multiple divided bodies 12 divided in the circumferential direction are further divided in the width direction. Out of the resultant divided bodies 12, those on one side in the width direction are first moved around a rotation mechanism 13 as the rotation center in a radially-outward direction. Then, the divided bodies 12 on the other side are similarly moved and attached to the primary molded body G1 in an annular shape. With such attachment operation, the rigid inner mold 11 is inserted inside the primary molded body G1.

Subsequently, suction by the transfer and holding mold 9 is stopped, and the primary molded body G1 is transferred to the outer peripheral surface of the rigid inner mold 11. After the primary molded body G1 is transferred, the transfer and holding mold 9 is separated into divided molds 9a, and detached from the primary molded body G1.

In this way, according to the present invention, the primary molded body G1 is set to be sucked and held to the inner peripheral surface of the transfer and holding mold 9, then is transferred to the outer peripheral surface of the rigid inner mold 11, and thus transfer operation can be performed smoothly without damaging the film 22 which serves as the inner layer.

Figure 9:
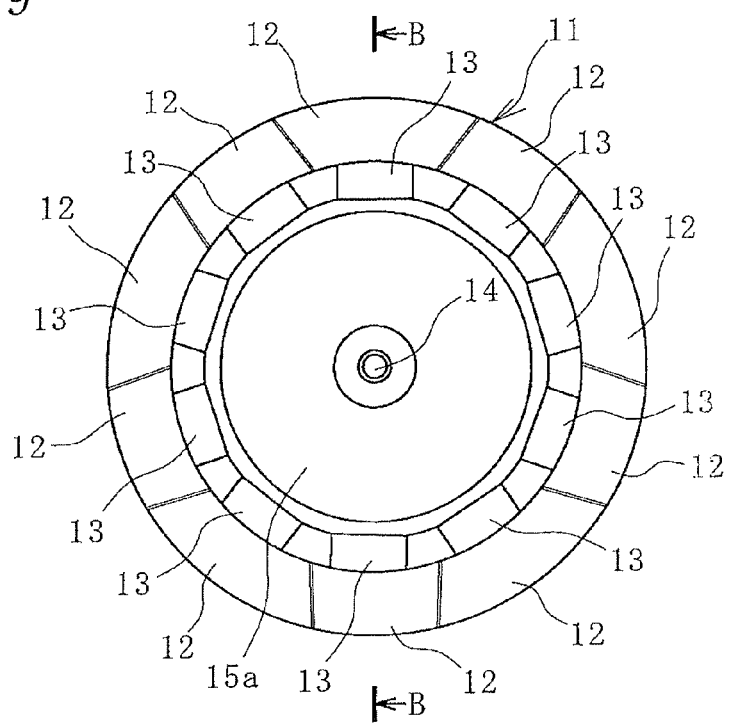
FIG. 9 is a front view of the rigid inner mold.
Figure 10:
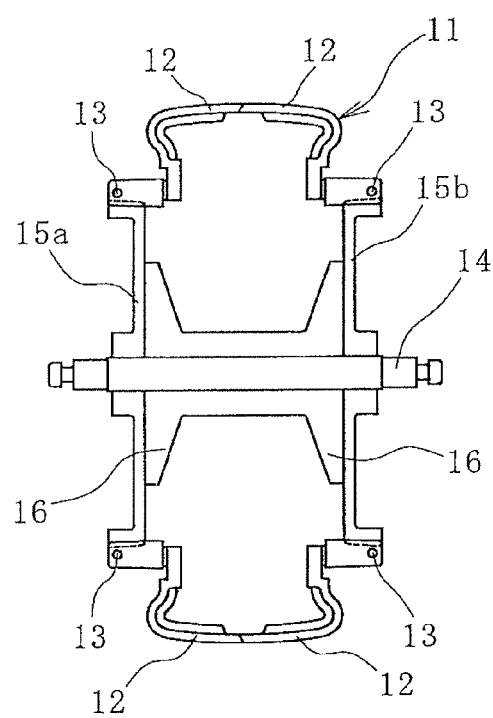
FIG. 10 is a cross-sectional view taken along B-B in FIG. 9.

The rigid inner mold 11 is in a cylindrical shape as illustrated in FIGS. 9 and 10, and includes the divided bodies 12 plurally divided in the circumferential direction. The divided bodies 12 are further divided in half in the width direction of the cylindrically-shaped peripheral surface. Examples of the material of the rigid inner mold 11 include metal such as aluminum and an aluminum alloy.

These divided bodies 12 are fixed to peripheral edge portions of opposed disc-shaped supporting plates 15a, 15b via the rotation mechanisms 13, and are formed in a cylindrical shape. That is to say, out of the divided bodies 12 divided in half in the width direction of the cylindrically-shaped peripheral surface, those on one side in the width direction are disposed in an annular shape along the peripheral edge portion of the supporting plate 15a on one side out of the opposed supporting plates 15a, 15b, and out of the divided bodies 12 divided in half in the width direction of the cylindrically-shaped peripheral surface, those on the other side in the width direction are disposed in an annular shape along the peripheral edge portion of the supporting plate 15b on the other side.

A central shaft 14 is fixed at the circle center position of the opposed supporting plates 15a, 15b to pass therethrough. The central shaft 14 and a pair of the supporting plates 15a, 15b are fixed to each other via a supporting rib 16 fixed on the outer peripheral surface of the central shaft 14. As described later, the rigid inner mold 11 including the multiple divided bodies 12 formed in a cylindrical shape is moved so that each divided body 12 is rotated in a diameter expanding or reducing direction around the rotation mechanism 13 as the rotation center.

Figure 11:
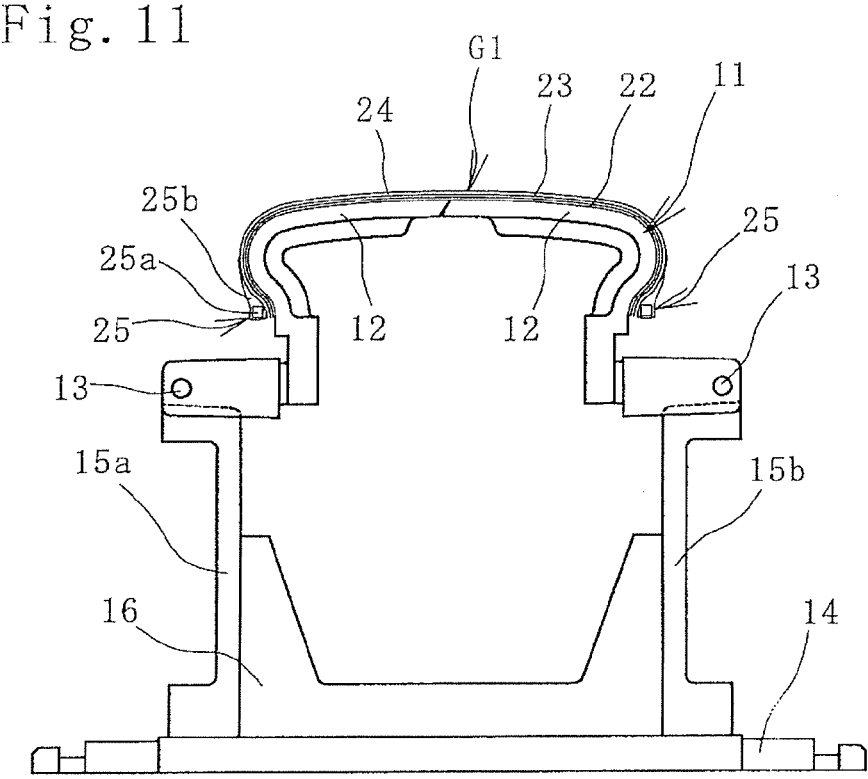
FIG. 11 is an upper half vertical sectional view illustrating the rigid inner mold to which the primary molded body is transferred.

Next, as illustrated in FIG. 11, the cylindrically-shaped rigid inner mold 11, to which the primary molded body G1 is transferred, is mounted on a molding apparatus and the like with the central shaft 14 being supported in order to mold the green tire G.

Figure 12:
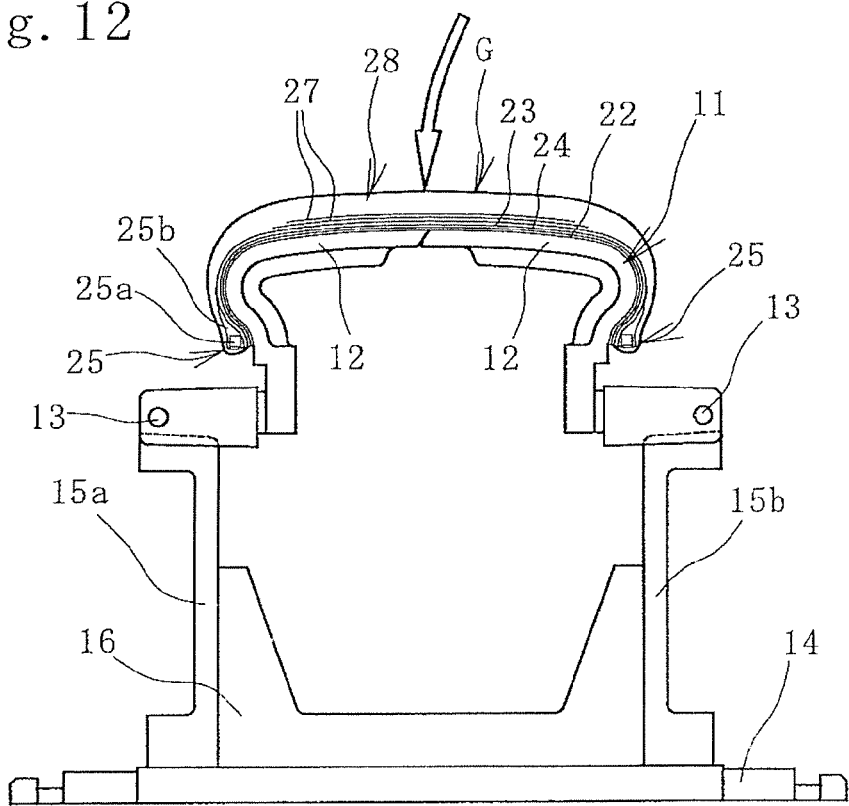
FIG. 12 is an upper half vertical sectional view illustrating the state where a green tire is molded to the outer peripheral surface of the rigid inner mold.

The opposite ends of the carcass material 24 in the width direction thereof are turned up on the rigid inner mold 11, while other tire constituting members such as the rubber member of the sidewall portion 26, the belt layers 27, the rubber member of the tread portion 28 are stacked on the outer peripheral surface of the primary molded body G1 so that the green tire G is molded as illustrated in FIG. 12. The green tire G has no tread patterns formed thereon, but is formed in approximately the same size and shape as the pneumatic tire 21 to be manufactured.

Figure 13:
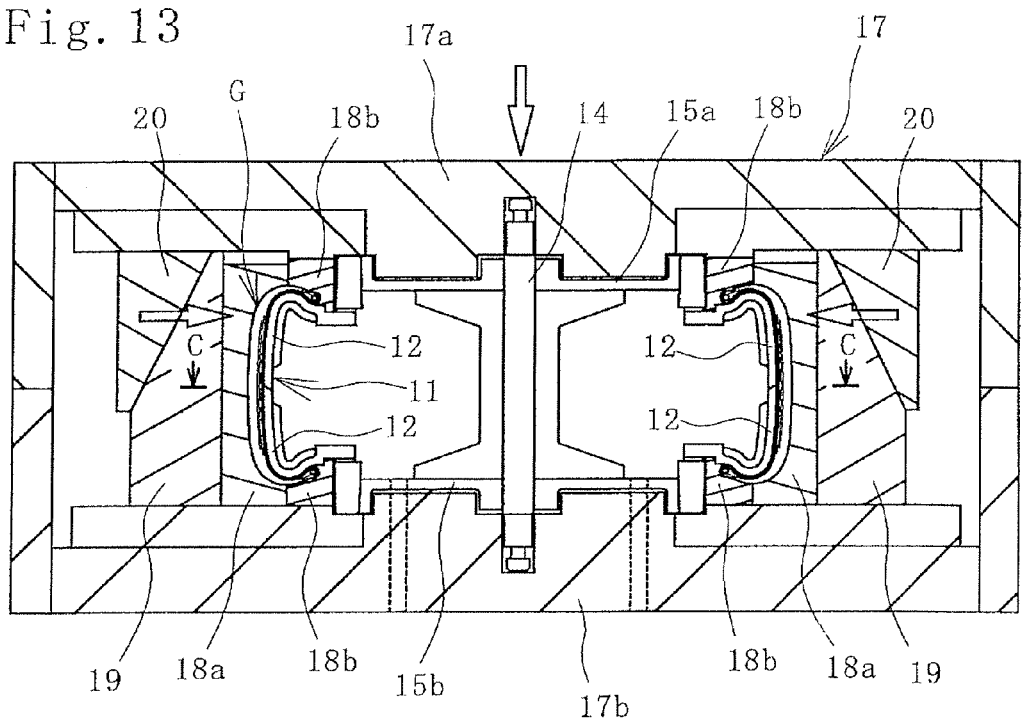
FIG. 13 is a vertical sectional view illustrating the state of curing the green tire in FIG. 12.

Next, as illustrated in FIG. 13, the molded green tire G is disposed, together with the rigid inner mold 11, at a predetermined position inside a curing mold installed in a curing apparatus 17. The curing mold includes multiple divided sectors 18a and upper and lower annular side plates 18b, 18b.

The lower side plate 18b is fixed in a bottom housing 17b in which each sector 18a is placed. A back segment 19 having an inclined surface is mounted on the rear surface of the sector 18a. A guide member 20 having an inclined surface and the upper side plate 18b are fixed in a top housing 17a.

After the lower end portion of the central shaft 14 of the rigid inner mold 11 holding the green tire G is inserted into the central hole of the bottom housing 17b, the top housing 17a is moved downward. Along with this downward movement, the guide member 20 moves downward, and the inclined surface of the guide member 20 comes in contact with the inclined surface of the back segment 19. As the guide member 20 moves downward, the sector 18a along with the back segment 19 gradually moves toward the central shaft 14. That is to say, the sectors 18a in a state of expanded diameter are moved in a radially-inward direction and are assembled to form an annular shape. Then the upper side plate 18b, which is moved downward, is disposed at the upper inner peripheral edge portions of the sectors 18a assembled in an annular shape. The upper end portion of the central shaft 14 is inserted into the central hole of the top housing 17a.

In this manner, the molded green tire G is disposed inside the curing mold together with the rigid inner mold 11. Thus, a conventional work of detaching the green tire G from the making drum is not required, and this work process can be omitted. In addition, the central holes of the top housing 17a and the bottom housing 17b are formed with a predetermined precision, whereby positioning can be made by only inserting the central shaft 14 of the rigid inner mold 11 into the central holes, and the green tire is easily disposed at a predetermined position inside the curing mold with high precision. Accordingly, the productivity improves and the pneumatic tire 21 can be manufactured efficiently.

Figure 14:
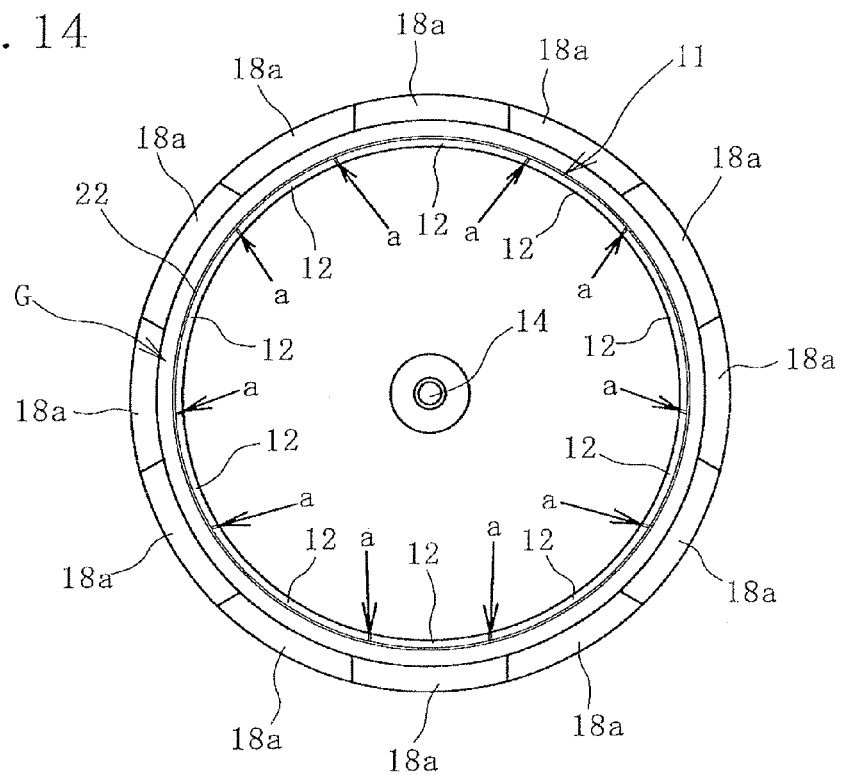
FIG. 14 is a cross-sectional view taken along C-C in FIG. 13.

Next, as illustrated in FIG. 14, the rigid inner mold 11 and the curing mold are heated to a predetermined temperature and the film 22 is pressurized by supplying the air a from the inner peripheral side thereof to be inflated, so that the green tire G is cured. Examples of the air a to be supplied include gases such as general air and nitrogen gas. Moreover, the pressure for inflating the film 22 is, for example, approximately 0.01 MPa to 3.0 MPa.

Figure 15:
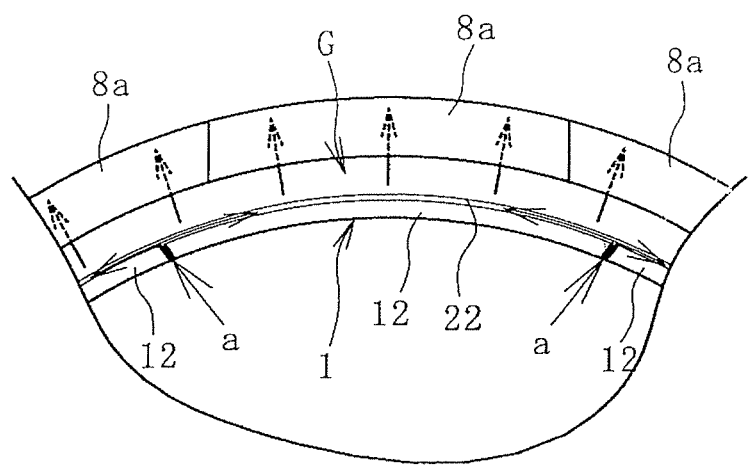
FIG. 15 is a partial enlarged view of FIG. 14.

As illustrated in FIG. 15, a jet of the air a coming out of a gap between any two adjacent divided bodies 12 flows in between the outer peripheral surfaces of the divided bodies 12 and the inner peripheral surface of the film 22. This presses unvulcanized rubber in the tire constituting members against the inner peripheral surface of the sector (curing mold) 18a and thus flows in the circumferential direction of the sector 18a. Accordingly, even when non-uniformity in the volume of the tire constituting members of the green tire G exists, the non-uniformity can be corrected. Hence, uniformity of the pneumatic tire 21 to be manufactured can be improved.

Note that the pressurizing by supplying the air a from the inner peripheral side of the film 22 may be performed after the sectors 18a and the upper and lower side plates 18b, 18b are assembled. The pressurizing may be performed to some extent before the assembly, or may be performed during the assembly.

Along with the curing of the green tire G, the film 22 which serves as a conventional bladder in this manner is brought into close contact with and bonded to the inner peripheral surface of the tire (rubber members disposed on the outer peripheral side of the film 22), so that the pneumatic tire 21 having the film 22 as the inner layer is manufactured.

In order to increase the bonding power between the film 22 and the inner peripheral surface of the tire, an adhesive layer may be previously provided on the outer peripheral surface of the film 22. The tie rubber 23 is disposed to cover the entire outer peripheral surface of the film 22, but the tie rubber 23 may be disposed to cover apart of the outer peripheral surface of the film 22. If a certain bonding strength between the film 22 and the members on the outer peripheral side of the film 22 can be secured, the tie rubber 23 may be omitted.

In the present invention, a conventional bladder is not used, and thus maintenance of the bladder is not needed, which is advantageous to the improvement of productivity.

The rigid inner mold 11 and the curing mold can be heated by various heat sources. For example, an electric heating body embedded in the rigid inner mold 11 and the curing mold may be used. Heating by an electric heating body enables a precise temperature control. In addition, a cooling device may be provided to the rigid inner mold 11.

In this curing process, the outer peripheral surface of the green tire G is molded into a predetermined shape by the sector 18a, whereas the inner peripheral surface is brought into contact with and molded by the inflated film 22. Accordingly, unlike the manufacturing method which uses a conventional bladder made of rubber, or the manufacturing method which presses the green tire on the outer peripheral surface of the rigid inner mold, no undesired marks are left on the inner peripheral surface of the cured pneumatic tire, whereby a smooth surface is created, and accordingly appearance quality is improved.

It is also possible that the air A is forcibly sucked from the inside of the curing mold to the outside so that the green tire G is cured in a negative pressure state. For example, vacuum is drawn by a vacuum pump through a communication hole provided in the outer peripheral surface of the curing mold. In this manner, the air between the stacked tire constituting members, or the air in the tire constituting members (rubber members) can be removed, and thus a problem due to trapped air in the manufactured pneumatic tire 21 can be prevented, and thereby its quality can be improved.

Figure 16:
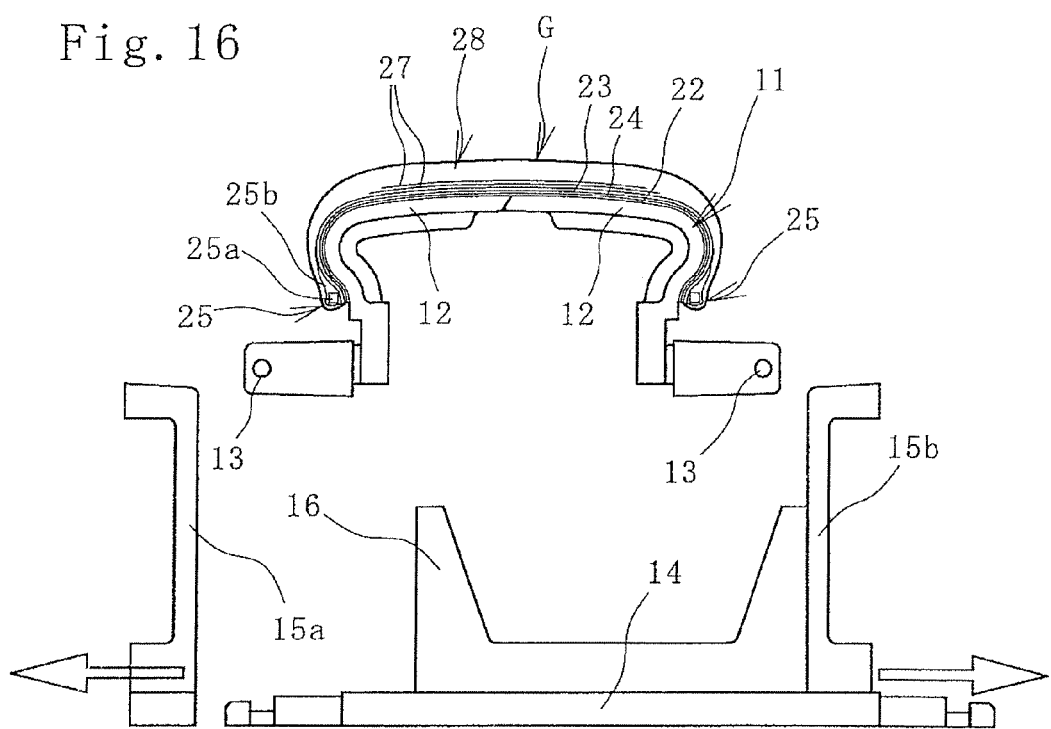
FIG. 16 is an upper half vertical sectional view illustrating the process of detaching the rigid inner mold from the cured tire.

Next, the cured pneumatic tire 21, together with the rigid inner mold 11, is taken out of the curing apparatus 17, and then the rigid inner mold 11 is detached from the cured pneumatic tire 21. In order to detach the rigid inner mold 11, first, as illustrated in FIG. 16, the rotation mechanisms 13 of the divided bodies 12 are held from both sides in the width direction of the rigid inner mold 11, and engagement between the rotation mechanisms 13 and the supporting plates 15a, 15b is released. In this state, one supporting plate 15a is removed from the central shaft 14, and then the supporting plate 15a and the other supporting plate 15b with the central shaft 14 fixed thereto are moved to the outside of the green tire G.

Figure 17:
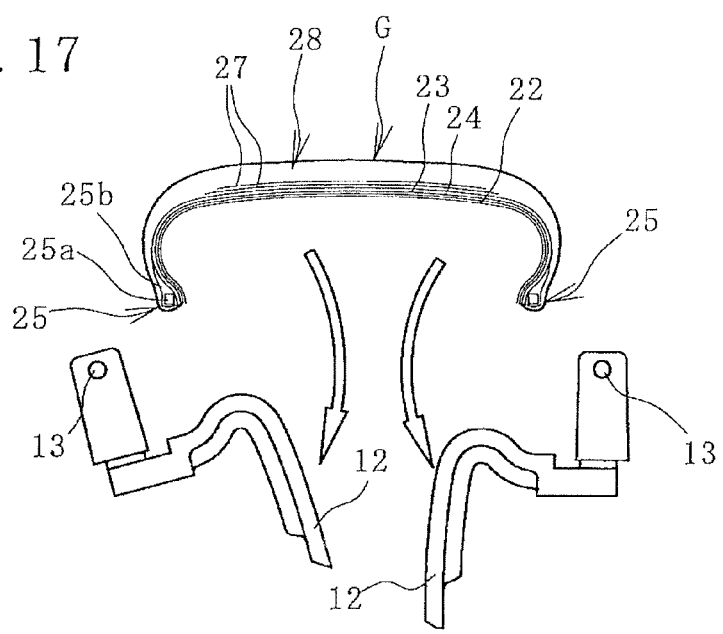
FIG. 17 shows an upper half vertical sectional view illustrating the next process in FIG. 16.

Next, as illustrated in FIG. 17, the divided bodies 12 on one side in the width direction (right side in FIG. 14) are rotated around the rotation mechanism 13 as the center toward the inside of the tire so that the cylindrically-shaped rigid inner mold 11 reduces its diameter. Subsequently, the divided bodies 12 on the other side in the width direction (left side in FIG. 14) are rotated around the rotation mechanism 13 as the center toward the inside of the tire so that the cylindrically-shaped rigid inner mold 11 reduces its diameter. In this manner, the divided bodies 12 are rotated toward the inside of the tire, and then are moved to the outside of the pneumatic tire 21 to be detached.

The film 22 can be easily separated from the divided body 12. For this reason, compared with a pneumatic tire whose inner layer is formed of butyl rubber, the rigid inner mold 11 can be detached smoothly. Due to excellent release characteristics of the film 22, an additional work of, for example, applying release agent between the inner peripheral surface of the tire and the rigid inner mold 11 (the divided bodies 12) is not required, which is further advantageous to the improvement of productivity.

In order to assemble the rigid inner mold 11 in a cylindrical shape, the process reverse to the process of dividing the rigid inner mold 11 illustrated in FIGS. 16 and 17 may be performed.

As described above, in the present invention, the film 22 formed of a thermoplastic resin or a thermoplastic elastomer composition is effectively used, and is made to serve as a release material among the bladder, the inner layer of the tire, and the rigid inner mold 11 (divided bodies 12). Accordingly, the pneumatic tire 21 with excellent uniformity, having an inner layer which is light in weight and excels in air penetration preventing performance can be efficiently manufactured.

In the above-mentioned embodiments, the cases where radial tires are manufactured are taken as examples; however, the present invention can be even applied to cases of manufacturing bias tires.

What is claimed is:

1. A method of manufacturing a pneumatic tire, comprising:
    forming a primary molded body by fitting bead rings on opposite ends, in a width direction, of a cylindrically-shaped body in which at least a carcass material is mounted on an outer peripheral side of a film formed of a thermoplastic resin or a thermoplastic elastomer composition obtained by blending a thermoplastic resin with an elastomer;
    moving the bead rings closer to each other, and pressing the primary molded body with multiple pressing plates to expand and deform the primary molded body into an expanded and deformed primary molded body, such that a width-central portion of the expanded and deformed primary molded body is expanded in a direction toward an outer peripheral side of the expanded and deformed primary molded body;
    sucking and holding the expanded and deformed primary molded body to an inner peripheral surface of a transfer and holding mold that contacts the expanded and deformed primary molded body at a location between the opposite ends of the expanded and deformed primary molded body while pressurizing the expanded and deformed primary molded body so that the expanded and deformed primary molded body is held in a shape by the transfer and holding mold such that a first area that is between a first one of the bead rings and the width-central portion extends further outward in the width direction than the first one of the bead rings and a second area that is between a second one of the bead rings and the width-central portion extends further outward in the width direction than the second one of the bead rings;
    inserting a cylindrically-shaped rigid inner mold including a plurality of divided bodies inside the expanded and deformed primary molded body while the expanded and deformed primary molded body is being held to the inner peripheral surface of the transfer and holding mold;
    after the inserting, stopping suction by the transfer and holding mold, and transferring the expanded and deformed primary molded body to an outer peripheral surface of the rigid inner mold;
    turning up opposite ends of the carcass material in a width direction thereof on the rigid inner mold, while other tire constituting members are stacked on an outer peripheral surface of the expanded and deformed primary molded body so that a green tire is molded;
    placing the green tire, together with the rigid inner mold, inside a curing mold installed in a curing apparatus;
    heating the rigid inner mold and the curing mold to a predetermined temperature and pressurizing the film from an inner peripheral side to inflate the film, so that the green tire is cured to form a cured tired and the film is brought into close contact with and bonded to an inner peripheral surface of the cured tire;
    removing the cured tire from the curing apparatus; and
    detaching the rigid inner mold from the cured tire.

2. The method of manufacturing a pneumatic tire according to claim 1, wherein
    when the green tire is cured, the film is pressurized to be inflated from its inner peripheral side with a pressure of 0.01 MPa to 3.0 MPa.

3. The method of manufacturing a pneumatic tire according to claim 1, further comprising
    sucking air from an inside of the curing mold to an outside, while the green tire disposed inside the curing mold is cured.

4. The method of manufacturing a pneumatic tire according to claim 3, further comprising
    sucking air from an inside of the curing mold to an outside, while the green tire disposed inside the curing mold is cured.

* * * * *